United States Patent Office 3,439,745
Patented Apr. 22, 1969

3,439,745
**COMBINED PROPELLER PITCH LOCK
AND LOW PITCH STOP SYSTEM**
Leonard L. Gaubis, East Granby, and Thomas F.
McDonough, Windsor, Conn., assignors to
United Aircraft Corporation, East Hartford,
Conn., a corporation of Delaware
Filed Mar. 30, 1966, Ser. No. 538,861
Int. Cl. B63h 3/00; B64c 11/34
U.S. Cl. 170—160.21                                    2 Claims

ABSTRACT OF THE DISCLOSURE

A blade switch on a propeller blade closes an electrical circuit at a predetermined blade angle and the circuit causes pitch lock pressure to be dumped, thereby allowing the pitch lock ratchet teeth to engage and thus causing the propeller to pitch stop at the predetermined blade angle.

---

This invention relates to adjustable pitch propellers and particularly to pitch lock and low pitch stop mechanisms for such propellers.

It is customary in the aeronautical propeller art to provide separate mechanisms and controls for propeller pitch locks and low pitch stops. We have developed a single system which functions as both a pitch lock or a low pitch stop depending on the operating requirements of the propeller. By combining these operations we have eliminated the need for a considerable amount of large, heavy, low pitch stop hardware while increasing only slightly the complexity of the control system for the propeller.

Therefore, it is an object of our invention to eliminate the necessity for two sets of hardware to provide a low pitch stop and a pitch lock.

Our invention may be understood by reference to the accompanying drawings in which.

The propeller and control assembly shown here are in many respects similar to those disclosed in Patents Nos. 3,175,620; 2,703,148 and 2,402,065. Reference should be made to these patents for details which are not shown or described herein.

Figure 1:
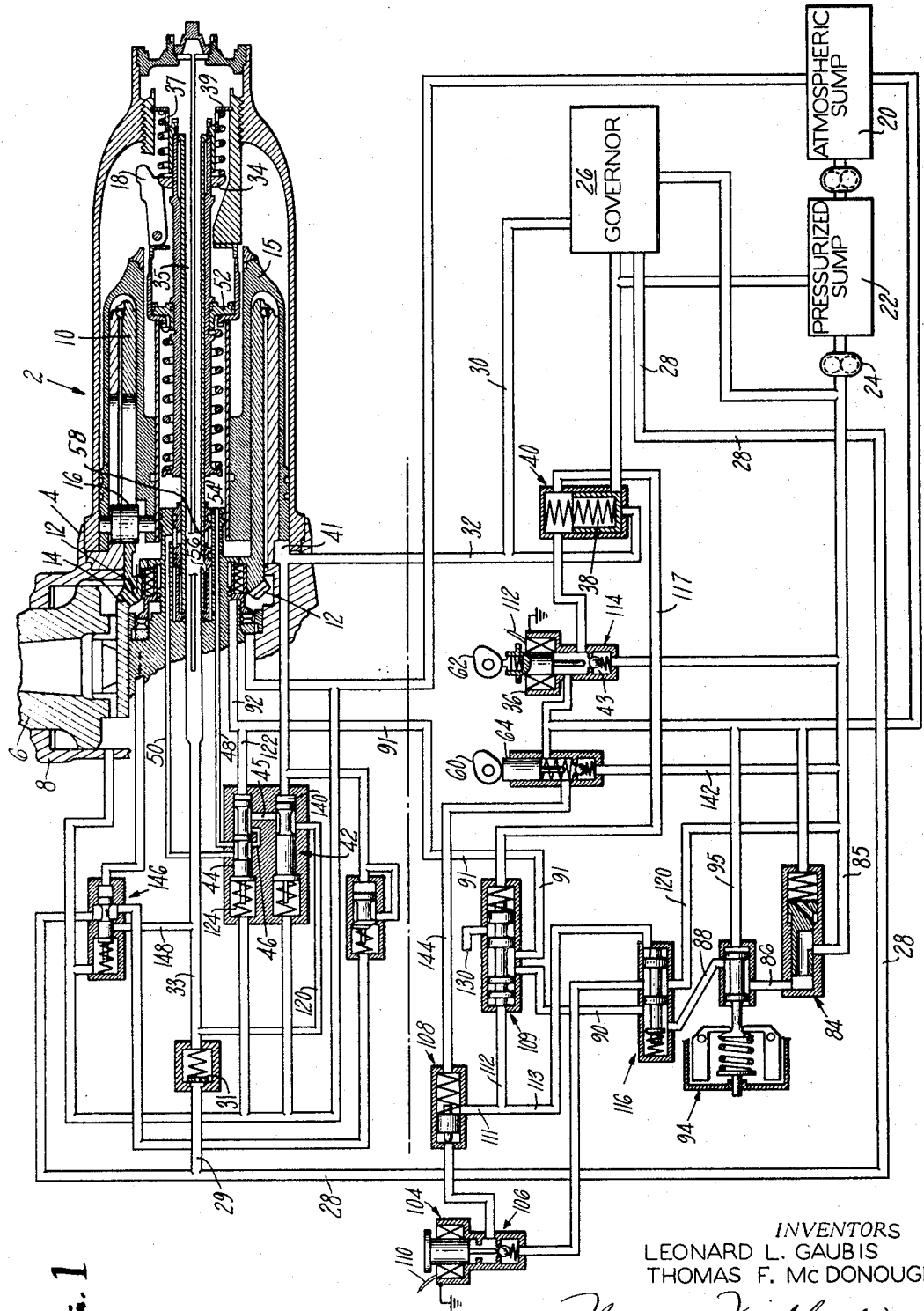
FIGURE 1 is a schematic representation of a propeller and control assembly embodying our invention.
Figure 2:
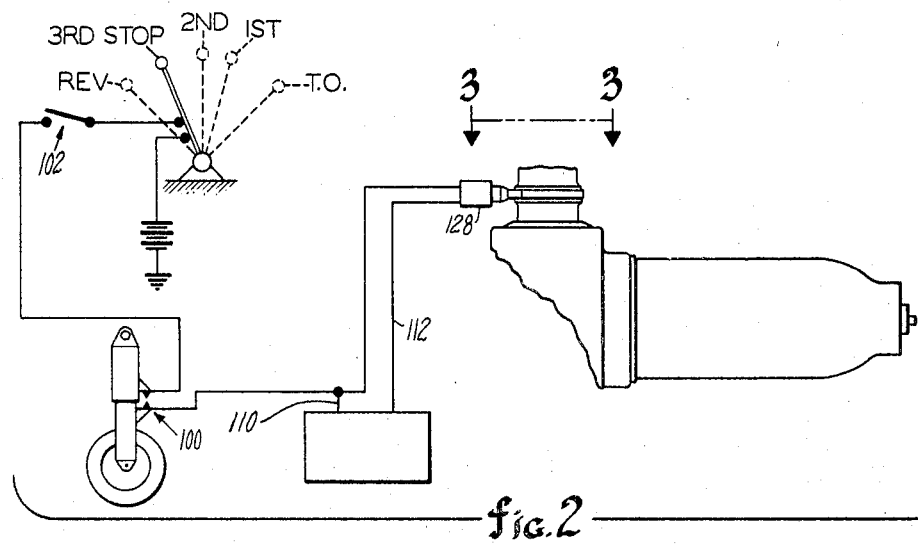
FIGURE 2 is a schematic representation of the electrical circuit for activating a low pitch stop in the propellers shown in FIGURE 1.
Figure 3:
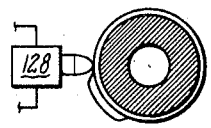
FIGURE 3 is a top view of the blade cam and switch shown in FIGURE 2.

Reference is made to the schematic shown in FIGURE 1. The propeller generally indicated by numeral 2 includes a hub 4 which is adapted to be rotated by a propeller shaft, not shown. A plurality of blades 6 are rotatably supported in blade receiving sockets 8. A pitch changing cam 10, which has a master gear 12 fixed to its inboard end, is rotatably mounted in the hub. The master gear 12 engages gear sectors 14 on the blades so that rotation of the gear will rotate the blades and change their pitch in unison. The axial motion of a pitch change piston 15 is converted to rotary motion of the pitch change cam 10 by means of the pin and roller assemblies 16 which move with the piston 15 and engage angular slots in the cam 10. A preponderance of oil pressure on either side of the piston will cause the blades to change pitch in unison.

The movement of the pitch change piston 15 in the decreasing pitch direction is limited by the retractable stop levers 18. This lever provides two low pitch flight stop positions and may be retracted completely to allow the pitch change piston 15 to move toward the reverse pitch direction.

The propeller control is a closed system including a fluid reservoir 20 at atmospheric pressure and a pressurized reservoir 22 at an intermediate pressure. A pump 24 supplies fluid at a relatively high pressure. A constant speed governor 26 provides a flow of fluid under pressure to the high and low pitch lines 28 and 30 respectively, for adjusting the propeller pitch to maintain a constant speed. The high pitch pressure fluid is directed from line 28 through the central portion of the propeller to the front side of the pitch changing piston 15 via line 29, resistor 31, line 33, passage 35 in dump valve tube 54, and radial holes 37 in the spring support 39. Low pitch pressure fluid from line 30 is directed to a pressure chamber 41 at the back, or hub side, of the pitch changing piston 15 via line 32.

The flight and approach stops for the propeller are identical with those shown and described in Patent No. 3,175,620. For normal flight operation the stop levers 18 are urged toward their fully extended, or raised position, as shown in FIGURE 1, by centrifugal force while the wedge 34 locks them in this position. For approach operation during landing the wedge 34 is retracted and the movement of the piston 15 toward low pitch forces the stop levers to a lower position which allows the pitch change piston 15 to move to a lower pitch. Operation of the approach, or second stop, is initiated electrically by a cockpit switch which activates the unfeather solenoid 36. This opens valve 43 and allows fluid under pump pressure to flow into chamber 38 of the decrease pitch relief valve 40 thereby increasing the set point of the valve. The decrease pitch relief valve normally limits the low pitch pressure in line 32 to less than that required to actuate the first, or primary, stop release valve 42. When the governor senses an underspeed condition during approach, fluid will be directed to the decrease pitch lines 30 and 32. Since the decrease pitch relief valve 40 is now operating at a much higher set point the pressure will build up until the decrease pitch pressure acting on the right-hand side of the first stop release valve 42 causes the valve to shift to the left allowing decrease pitch pressure fluid to flow through the valve to the approach or secondary stop release valve 44 via line 45 where it passes through the restricted line 46 into the servo piston and dump tube lines 48 and 50, respectively. The fluid from the servo piston line 48 acts on the back side of the servo piston 52 causing it to move forward. The wedge 34 is carried forward with the piston 52 allowing the levers 18 to be pushed to their next lower position by the movement of the piston 15 toward decrease pitch. The dump valve tube 54 is carried forward by the movement of the piston 15. When the slot 56 in the tube aligns with the dump valve metering window 58 servo piston pressure is dumped to high pitch fluid in the tube 35, thus removing the pressure differential acting on the servo piston and preventing further servo piston travel. Therefore, the propeller can now govern down to the second stop position. When the blade angles goes slightly below the flight stop position a cam-operated blade switch automatically deenergizes the unfeather solenoid 36.

Figure 4:
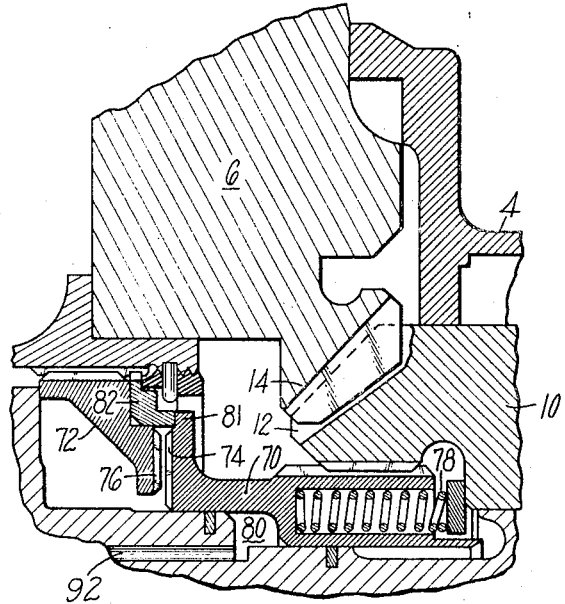
FIGURE 4 is a detailed view of the pitch locking hardware shown in FIGURE 1.

The pitch lock hardware, which is also used as the third position stop hardware, as explained below, is shown in detail in FIGURE 4. Annular lock member 70 is splined to the pitch change cam 10 so as to be rotatable with the cam while it is axially slidable along the axis of the propeller. A second cooperating annular lock member 72 is fixed to the hub 4. The adjacent faces of the lock members contain engageable ratchet teeth 74 and 76 for preventing relative rotation between the members, and therefore, between the pitch changing cam and the hub in the decreasing pitch direction, when the first lock member is engaged with the second lock member. The shape of the teeth allows a rotation motion toward high blade angles while providing a self-energizing or locking feature toward low blade angles. The first lock member is continuously urged in the engaged position by a plurality of springs 78. The lock is held in the disengaged position by application of fluid under pressure to the piston chamber 80. The teeth have a negative rake which prevents disengagement of the teeth until sufficient hydraulic pressure is available to move the blades slightly toward increase pitch.

A mechanical set of cooperating cam elements 81 and 82 positively prevent engagement of the locking members in the feather range and in the range from just above the primary stop through reverse, except at the third stop position.

Referring to FIGURE 1 the pressures required to hold the locking members of the pitch lock assembly apart during normal operation is continuously supplied by pump pressure metered through the pitch lock pressure regulating valve 84 via lines 85, 86, 88, 90, 91 and 92. Included in this circuit is the pitch lock governor 94 which is independent of the constant speed governor. If an engine overspeed occurs the flyweight of the pitch lock governor will position the governor to dump pitch lock pressure to the atmospheric sump via line 95 at a predetermined speed. The pitch lock will engage preventing the blades from decreasing pitch. Similarly, if system pressure is lost, pitch lock pressure is also lost and the pitch lock will engage. Because of the negative rake a return of pressure to the pitch lock system cannot disengage the locking members for normal governing unless sufficient pitch pressure is available to increase the blade angle slightly. As indicated above, the third-position, low-pitch stop, also referred to as the ground handling stop, utilizes the existing pitch lock hardware. The operation of this stop is electrically selected through a switch 102 in the cockpit. A landing gear switch 100 prevents the closing of the circuit when the airplane is not on the ground.

When the ground handling stop selector switch 102 and the landing gear switch 100 are closed, the electrical circuit energizes the unfeather solenoid 36 and the third stop solenoid 104. As described above in connection with the approach stop, activation of the unfeather solenoid increases the set point of the decrease pitch reverse valve thereby causing the first stop release valve 42 to move to the left thereby causing the first stop to be released. The energized third stop solenoid opens valve 106 causing pump pressure to be applied to the left side of the third stop selector valve 108 via line 115. This causes the selector valve to move to the right thereby routing pump pressure to the left end of the third stop dump valve 109 via line 112, and to the right end of the control secondary reversing valve 116 via lines 111 and 113. Pump pressure supplied to the right end of the third stop dump valve via line 117, relief valve 40 and line 119, balances the pressure on the left-hand side of the third stop dump valve thereby maintaining it in a neutral position. The pitch lock pressure line is thus held open to the chamber 80. The pump pressure on the right-hand end of the control secondary reversing valve 116 causes it to move to the left thereby routing pump pressure from line 120 into line 90 and thereby into the pitch lock chamber 80. The pump pressure in line 122 overcomes the set spring 124 and causes the secondary mechanical stop release valve 44 to be shuttled to the left thereby closing the dump valve line 50 and directing low pitch oil pressure from line 126 and line 45 directly into the servo piston line 48. The servo piston is stroked forward and since the dump valve line is no longer operative the piston will continue to move beyond the second stop position thereby allowing the stop levers 18 to be fully retracted. When the governor 26 is in an underspeed condition, the blades will move toward decreasing pitch when the blades go beyond the second, or approach stop position, to a predetermined point at which the third stop is desired; there a blade switch 128 deenergizes the unfeather solenoid 36. The closing of valve 114 removes pump pressure from the right side of the third stop dump valve 109 and pump pressure on the left side causes it to shift to the right thereby connecting pitch lock line 91 to atmospheric sump 20 via line 130. The pitch locking members engage and the blades become locked in the ground handling stop position.

Propeller reversing is a mechanical function of the power lever and results in fixed angle of reverse pitch. When the power lever is placed in the reverse position the governor is placed in an underspeed condition, thus directing fluid under pressure to the low pitch line 30. The power lever also rotates the reversing valve cam 60 and the mechanical secondary reversing valve cam 62 to open valves 64 and 43. As described above the reversing valve causes the decrease pitch release valve 40 to be backed up by pump pressure. When the decrease pitch pressure rises in chamber 140 the flight stop release valve 42 will shift to the left and admit decrease pitch oil to the approach stop relief valve 44 via line 45. The third stop dump valve 109 is maintained in a balanced position, which holds the pitch lock line 91 open to the chamber 80, by applying pump pressure to both sides of it as described above for the operation of the ground handling stop. Pump pressure from line 142 is routed to the right side of the mechanical secondary reversing valve 116 via line 142, valve 64, line 144, valve 108, line 111, and line 113 causing the valve to shift to the left and admit pump pressure from line 120 to the pitch lock line 90 as described above. The application of pump pressure to the pitch lock line causes the secondary stop release valve 44 to shift to the left closing the dump valve line 50 and applying low pitch oil from the primary mechanical stop release valve directly to the servo piston line 48. The wedge 34 is removed and the stop levers 18 may be retracted by the movement of the pitch change piston toward low pitch. As the blades decrease pitch the pitch lock is kept out of engagement by pump pressure in the pitch lock line.

During reversing operation the increased low pitch pressure also opens the restrictor bypass valve 146 causing additional low pitch pressure fluid to flow into line 53 via line 148.

Another embodiment of our invention which does not involve the complexity of the system described herein would be a simple circuit in which a blade switch in series with a manually activated switch controls a dump valve in a pitch lock line of a system such as that shown in Patent No. 3,175,620 referred to above.

Thus, this invention is described by way of illustration rather than limitation and accordingly it is understood that at this invention is to be limited only by the appended claims taken in view of the prior art.

We claim as our invention:

1. A combined pitch lock and low pitch stop system for a propeller having variable pitch blades comprising:
   a normally engaged retractable pitch lock for locking the blades against pitch reduction movement;
   means responsive to propeller speed for maintaining said pitch lock in the retracted position when the propeller speed is below a preset limit; and
   means responsive to a manual signal for overriding said speed responsive means and automatically engaging said lock when the blades go below a predetermined pitch.

2. A combined pitch lock and low pitch stop system for a propeller having variable pitch blades comprising:
- a source of fluid under pressure;
- a drain;
- a retractable pitch lock for locking the blades against pitch reduction movement;
- means for urging said pitch lock towards the engaged position;
- a piston disposed on said pitch lock;
- a pressure chamber on one side of said piston for receiving fluid under pressure and urging said piston and pitch lock towards the disengaged position;
- means responsive to propeller speed for conducting fluid under pressure from said source of fluid to said pressure chamber when the speed is below a predetermined limit; and
- means for interconnecting said pressure chamber to said drain when the blades go below a predetermined pitch, including a blade switch circuit for generating a signal when said blades go below a predetermined pitch, means responsive to said signal for interconnecting said chamber to said drain, and a manually activated switch in said circuit for controlling the closing of said circuit.

References Cited

UNITED STATES PATENTS

| | | | |
|---|---|---|---|
| 2,472,693 | 6/1949 | Brown | 170—160.22 |
| 2,635,700 | 4/1953 | Martin | 170—160.22 X |
| 2,882,975 | 4/1959 | Hirsch et al. | 170—160.32 |
| 2,944,769 | 7/1960 | Godden et al. | 170—160.2 X |
| 2,957,528 | 10/1960 | Flaugh et al. | 170—160.33 |
| 2,980,188 | 4/1961 | Allen et al. | 170—160.2 |
| 2,992,687 | 7/1961 | Brett et al. | 170—160.21 |
| 3,003,567 | 10/1961 | Flaugh et al. | 170—160.33 |
| 3,087,554 | 4/1963 | Conn et al. | 170—160.21 |
| 3,090,445 | 5/1963 | Fischer | 170—160.21 |
| 3,102,596 | 9/1963 | Newton et al. | 170—160.21 |
| 3,207,227 | 9/1965 | Timewell | 170—160.2 |

EVERETTE A. POWELL, JR., *Primary Examiner.*

U.S. Cl. X.R.

170—160.32